(12) United States Patent
Dods et al.

(10) Patent No.: US 8,352,639 B2
(45) Date of Patent: Jan. 8, 2013

(54) METHOD OF DEVICE SELECTION USING SENSORY INPUT AND PORTABLE ELECTRONIC DEVICE CONFIGURED FOR SAME

(75) Inventors: Jeffrey Alton Hugh Dods, Kitchener (CA); Nazih Almalki, Waterloo (CA); Sean Bartholomew Simmons, Waterloo (CA); Antoine Boucher, Kitchener (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 13/102,124

(22) Filed: May 6, 2011

(65) Prior Publication Data
US 2012/0284427 A1    Nov. 8, 2012

(51) Int. Cl.
  *G06F 3/00* (2006.01)
  *H04W 24/00* (2009.01)
(52) U.S. Cl. .......................................... 710/3; 455/456.6
(58) Field of Classification Search ........................ 710/3
  See application file for complete search history.

(56) References Cited

U.S. PATENT DOCUMENTS

| | | | |
|---|---|---|---|
| 6,308,227 B1 * | 10/2001 | Kumar et al. | 710/4 |
| 6,529,119 B1 | 3/2003 | Kumar et al. | |
| 6,717,516 B2 | 4/2004 | Bridgelall | |
| 7,031,875 B2 | 4/2006 | Ellenby et al. | |
| 7,173,604 B2 | 2/2007 | Marvit | |
| 7,532,901 B1 * | 5/2009 | LaFranchise et al. | 455/456.6 |
| 2005/0093868 A1 | 5/2005 | Hinckley | |
| 2005/0212750 A1 | 9/2005 | Marvit et al. | |
| 2005/0212911 A1 * | 9/2005 | Marvit et al. | 348/154 |
| 2006/0029015 A1 | 2/2006 | Hinsey | |
| 2007/0066323 A1 | 3/2007 | Park | |
| 2007/0105500 A1 | 5/2007 | Kim | |
| 2007/0146347 A1 | 6/2007 | Rosenberg | |
| 2008/0009309 A1 | 1/2008 | Gha | |
| 2008/0036647 A1 | 2/2008 | Jung | |
| 2008/0125040 A1 | 5/2008 | Kalayjian | |

(Continued)

FOREIGN PATENT DOCUMENTS

EP         1447944         8/2004

(Continued)

OTHER PUBLICATIONS

Video-In and Magnetometers Could Introduce Interesting iPhone App Possibilites, http://forums.macrumors.com/showthread.php?t=682647, MacRumors.com Forum, dated Apr. 8, 2009.

(Continued)

*Primary Examiner* — Henry Tsai
*Assistant Examiner* — Titus Wong
(74) *Attorney, Agent, or Firm* — Ridout & Maybee LLP

(57) ABSTRACT

The present disclosure provides a method of device selection using sensory input and portable electronic device configured for same. In accordance with one example embodiment, there is provided a method for use in a portable electronic device for selecting a peripheral device for connection with the portable electronic device, comprising: measuring a magnetic field within the vicinity of the portable electronic device; determining a relative location of at least two available peripheral devices in accordance with magnetic fields uniquely associated with the at least two available peripheral devices; selecting a peripheral device from the at least two available peripheral devices in accordance with the measured magnetic field; and connecting the portable electronic device to the selected peripheral device using a wireless communications path.

17 Claims, 6 Drawing Sheets

U.S. PATENT DOCUMENTS

| | | | | |
|---|---|---|---|---|
| 2009/0077501 | A1* | 3/2009 | Partridge et al. | 715/846 |
| 2009/0153288 | A1* | 6/2009 | Hope et al. | 340/3.1 |
| 2009/0265470 | A1* | 10/2009 | Shen et al. | 709/227 |
| 2011/0175822 | A1* | 7/2011 | Poon et al. | 345/173 |

FOREIGN PATENT DOCUMENTS

| | | |
|---|---|---|
| WO | WO 2011049762 | 4/2011 |

OTHER PUBLICATIONS

Jonathan Duncan, Mobile Phone Based Gesture Recognition for Large Screen Interaction, www.imamu.edu.sa/dcontent/IT_Topics/java/final%2520year%2520project%2520report.pdf, Mar. 20, 2009, 34 pages.

MagnetMeter—3D Vector Magnetometer and Accelerometer, Open iTunes to buy and download apps, http://itunes.apple.com/kz/app/magnetmeter-3d-vector-magnetometer/id346516607?mt=8, at least as early as Nov. 9, 2010, 1 page.

MagnetMeter on iPhone 3GS User Manual, http://www.plaincode.com/products/magnetmeter/manual.jsp, at least as early as Nov. 9, 2010, 6 pages.

iPhone 3GS Tech Specs, http://www.apple.com/iphone/iphone-3gs/specs.html, at least as early as Dec. 21, 2011, 5 pages.

10 Creative Ways to Use the Accelerometer [iPhone], http://www.creativeapplications.net/iphone/10-creative-waysto-use-the-accelerometer-iphone/, Jan. 13, 2009.

"Pairing", http://web.archive.org/web/20101019033032/http://docs.blueantwireless.com/en/Q1/tasks/pairing.php?, Oct. 19, 2010, 3 pages.

Dan Frakes, "Hands on with stereo Bluetooth and the iPhone 3.0 update", Jun. 18, 2009, http://www.macworld.com/article/141249/2009/06/iphonea2dp.html, 10 pages.

"What is Bluetooth Technology?", http://web.archive.org/web/20080502060259/http://www.bluetooth.com/btmicro/whatis.html, May 2, 2008, 1 page.

"Transferring Files over Bluetooth using a BlackBerry Curve, Pearl, or 8800", http://linuxappfinder.com/blog/transferring_files_over_bluetooth_using_a_blackberry_curve_pearl_8800, Aug. 14, 2007, 10 pages.

"Compass Heading Using Magnetometers", Honeywell, at least as early as Nov. 9, 2010.

Electromagnet, Wikipedia entry, http://en.wikipedia.org/wiki/Electromagnet, at least as early as Feb. 24, 2011, 17 pages.

"Mover for iOS devices", http://itunes.apple.com/us/app/mover-connect/id402831494?mt=12, Dec. 10, 2010, 2 pages.

Thomas Ricker, LG Optimus 7 Windows Phone 7 prototype flicks photos to TVs, launches October, http://www.engadget.com/2010/09/04/lg-optimus-7-windows-phone-7-prototype-flicks-photos-to-tvs-lau/, Sep. 4, 2010, 7 pages.

Extended European Search Report; EP 11165051.1; Oct. 19, 2011.

* cited by examiner

METHOD OF DEVICE SELECTION USING SENSORY INPUT AND PORTABLE ELECTRONIC DEVICE CONFIGURED FOR SAME

TECHNICAL FIELD

The present disclosure relates to portable electronic devices, and more particularly to a method of device selection using sensory input and portable electronic device configured for same.

BACKGROUND

Electronic devices, including portable electronic devices, are increasingly being configured for gestural control as part of the movement towards ubiquitous computing in which devices are adapted for more natural and intuitive user interaction instead of requiring the user to adapt to the device. The majority of gestural controls are in the form of touch gestures detected with a touch-sensitive display or motion gestures detected with a motion sensor such as an accelerometer. Alternative forms of gestural control are desirable to provide a more natural and intuitive user interaction with an electronic device.

DETAILED DESCRIPTION OF EXAMPLE EMBODIMENTS

Figure 1:
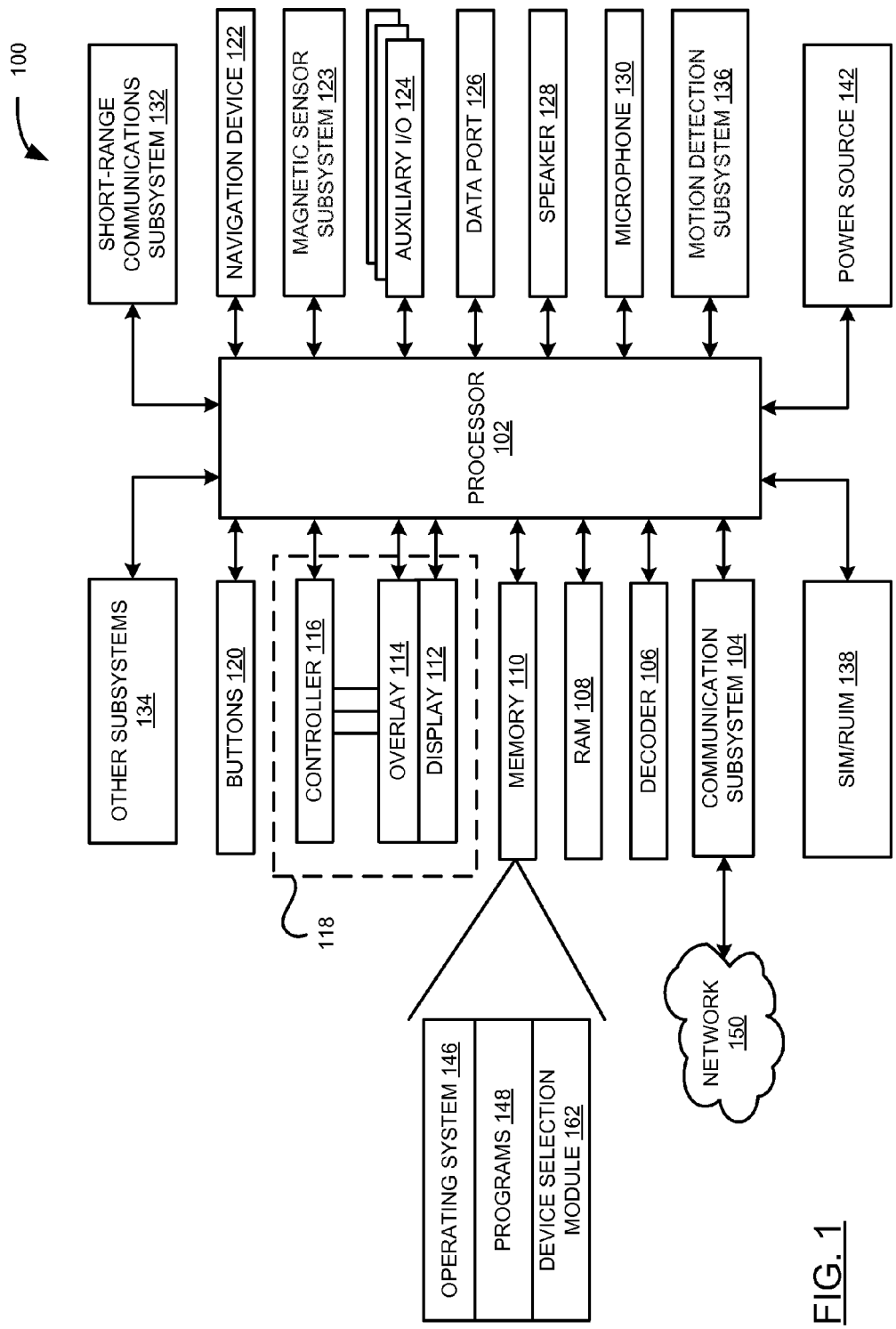
FIG. 1 is a simplified block diagram of components of a portable electronic device in accordance with one example embodiment of the present disclosure.

Reference will now be made to the accompanying drawings which show, by way of example, example embodiments of the present disclosure. For simplicity and clarity of illustration, reference numerals may be repeated among the Figures to indicate corresponding or analogous elements. Numerous details are set forth to provide an understanding of the example embodiments described herein. The example embodiments may be practiced without these details. In other instances, well-known methods, procedures, and components have not been described in detail to avoid obscuring the example embodiments described. The description is not to be considered as limited to the scope of the example embodiments described herein. Any reference to direction or orientation herein is for convenience and is not intended to be limiting unless explicitly stated herein.

The present disclosure generally relates to a portable electronic device such as a handheld electronic device. The portable electronic device may be a portable electronic device with or without wireless communication capabilities. Examples of handheld electronic devices include, but are not limited to, pagers, mobile telephones, smartphones, tablet computing devices, wireless organizers, personal digital assistants, electronic gaming device, digital photograph album, digital camera, and so forth. The portable electronic device, when a mobile telephone or smartphone, may be provided in any form factor including, but not limited to, a bar-style, brick-style device, slider-style device or flip-style device. The teachings of present disclosure may also be applied outside of the portable electronic device.

The present disclosure provides a solution for detecting, selecting and connecting to peripheral devices from a portable electronic device. A magnetic sensor in the portable electronic device is used to detect the location of nearby peripheral devices. After the location of the peripheral devices has been detected, the portable electronic device can select one of the nearby peripheral devices in accordance with selection input. A connection may then be established between the portable electronic device and the selected peripheral device.

In accordance with one example embodiment, there is provided a method for use in a portable electronic device for selecting a peripheral device for connection with the portable electronic device, comprising: measuring a magnetic field within the vicinity of the portable electronic device; determining a relative location of at least two available peripheral devices in accordance with magnetic fields uniquely associated with the at least two available peripheral devices; selecting a peripheral device from the at least two available peripheral devices in accordance with the measured magnetic field; and connecting the portable electronic device to the selected peripheral device using a wireless communications path.

In accordance with another example embodiment, there is provided an electronic device, comprising: a processor; a magnetic sensor coupled to the processor for detecting a magnetic field within the vicinity of the electronic device; a wireless communication subsystem coupled to the processor; wherein the processor is configured for: measuring a magnetic field within the vicinity of the portable electronic device; selecting a peripheral device from available peripheral devices in accordance with the measured magnetic field; and connecting to the selected peripheral device using a wireless communication path. In some examples, the processor is configured for: determining a relative location of the available peripheral devices in accordance with magnetic fields uniquely associated with particular peripheral devices; receiving a directional input; identifying the peripheral device from the available peripheral devices in accordance with the relative location of the available peripheral devices and the directional input; and selecting the identified peripheral device. In some examples, the electronic device further comprises a touch-sensitive display coupled to the processor, wherein the directional input is a touch gesture received using the touch-sensitive display. In some examples, the electronic device further comprises a motion sensor coupled to the processor, wherein the directional input is a motion gesture using the motion sensor.

In accordance with a further example embodiment, there is provided a method for use on a peripheral device of generating a magnetic field, comprising: receiving a request from a portable electronic device; sending a response to the portable electronic device generating a magnetic field in response to receiving the request; and connecting to the portable electronic device using a wireless communication path. In some examples, the magnetic field has one or more distinct characteristics which are uniquely associated with the peripheral device. In some examples, the magnetic field is a time varying magnetic field which provides a distinct magnetic signature uniquely associated with the peripheral device. In some examples, the wireless communication path is a BLUETOOTH® communication path.

In accordance with yet a further example embodiment, there is a peripheral device comprising: a processor; a magnetic signal subsystem coupled to the processor for generating a magnetic field having one or more distinct characteristics; a wireless communication subsystem coupled to the processor; wherein the processor is configured for: receiving a request from a portable electronic device; sending a response to the portable electronic device; generating a magnetic field in response to receiving the request; and connecting to the portable electronic device using a wireless communication path. In some examples, the magnetic field has one or more distinct characteristics which are uniquely associated with the peripheral device. In some examples, the magnetic field is a time varying magnetic field which provides a distinct magnetic signature uniquely associated with the peripheral device. In some examples, the wireless communication path is a BLUETOOTH® communication path.

In accordance with yet a further embodiment of the present disclosure, there is provided a computer program product comprising a computer readable medium having stored thereon computer program instructions for implementing a method on an electronic device, the computer executable instructions comprising instructions for performing the method(s) set forth herein.

Reference is made to FIG. 1, which illustrates in block diagram form, a portable electronic device 100 to which example embodiments described in the present disclosure can be applied. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110 such as flash memory, a display 112 (such as a liquid crystal display (LCD)) with a touch-sensitive overlay 114 operably coupled to an electronic controller 116 that together comprise a touch-sensitive display 118, one or more keys or buttons 120, a navigation device 122, a magnetic sensor subsystem 123, one or more auxiliary input/output (I/O) subsystems 124, a data port 126, a speaker 128, a microphone 130, a short-range wireless communication subsystem 132, other device subsystems 134 and a motion detection subsystem 136. User-interaction with a graphical user interface (GUI) rendered and displayed on the touch-sensitive display 118 via the processor 102 is performed using input devices including the touch-sensitive display 118. The GUI displays user interface screens on the display 112 which display information such as text, characters, symbols, images, icons, and other items.

Figure 2:
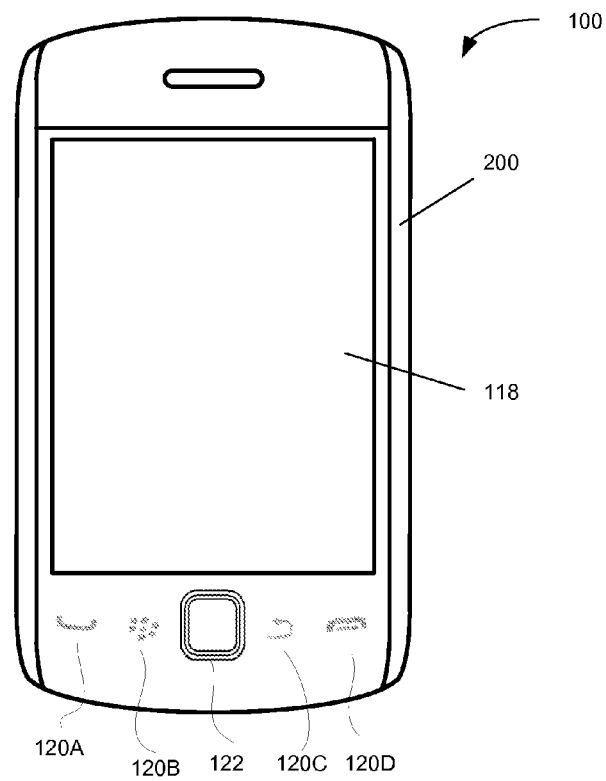
FIG. 2 is a front view of an example of a portable electronic device in a portrait orientation.

Referring to FIG. 2, the buttons 120, represented individually by references 120A, 120B, 120C and 120D, are located below the touch-sensitive display 118 on a front face of the portable electronic device 100. The buttons 120 generate corresponding input signals when activated. The buttons 120 may be constructed using any suitable button (or key) construction such as, for example, a dome-switch construction. The actions performed by the device 100 in response to activation of respective buttons 120 are context-sensitive. The action performed depends on a context that the button was activated. The context may be, but is not limited to, a device state, application, screen context, selected item or function, or any combination thereof.

The buttons 120, in the shown embodiment, are an answer (or send) button 120A, menu button 120B, escape (or back) button 120C, and a hang up (or end) button 120D. The send/answer button 120A may be used for answering an incoming voice call, invoking a menu for a phone application when there is no voice call in progress, or initiating an outbound voice phone call from the phone application when a phone number is selected in the phone application. The menu button 120B may be used to invoke a context-sensitive menu comprising context-sensitive menu options. The escape/back button 120C may be used to cancel a current action, reverse (e.g., "back up" or "go back") through previous user interface screens or menus displayed on the touch-sensitive display 118, or exit the current application 148. The end/hang up button 120D may be used to end a voice call in progress or hide the current application 148.

The navigation device 122 may be a depressible (or clickable) joystick such as a depressible optical joystick, a depressible trackball, a depressible scroll wheel, or a depressible touch-sensitive trackpad or touchpad. When the navigation device 122 is a depressible optical joystick as shown in FIG. 2, movements of the user's finger, such as vertical and horizontal movements, are detected by an optical sensor of the optical joystick. Up, down, left or right movements detected by the optical joystick are interpreted as corresponding up, down, left or right navigation commands. Typically, navigation via the optical joystick is by 1:1 movement so that each directional gesture or movement detected by the optical joystick causes a corresponding navigation movement.

The auxiliary I/O subsystems 124 may include other input devices such as a keyboard or keypad.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The short-range wireless communication subsystem 132 provides a short-range wireless communication interface. The short-range wireless communication interface is typically a BLUETOOTH® interface but may be another type of short-range wireless communication interface including, but not limited to, an infrared (IR) interface such as an Infrared Data Association (IrDA) interface, an IEEE 802.15.3a interface (also referred to as UltraWideband (UWB)), Z-Wave interface, ZigBee interface or other suitable short-range wireless communication interface.

The portable electronic device 100 includes an operating system 146 and software applications 148 that are executed by the processor 102 and are typically stored in a persistent, updatable storage such as the memory 110. Additional applications 148 may be loaded onto the portable electronic device 100 through the wireless network 150, the auxiliary I/O subsystem 124, the data port 126, the short-range wireless communication subsystem 132, or any other suitable subsystem 134. The applications 148 include a device selection module 162 for selecting peripheral devices using sensory input, as described more fully below. The device selection module 162 may be a standalone application or part of the operating system 146.

A received signal such as a text message, an e-mail message, or web page download is processed by the communication subsystem 104 and input to the processor 102. The processor 102 processes the received signal for output to the display screen 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

FIG. 2 shows a front view of an example of the portable electronic device 100 in portrait orientation. The portable electronic device 100 includes a housing 200 that houses internal components including internal components shown in FIG. 1 and frames the touch-sensitive display 118 such that the touch-sensitive display 118 is exposed for user-interaction therewith when the portable electronic device 100 is in use. It will be appreciated that the touch-sensitive display 118 may include any suitable number of user-selectable features rendered thereon, for example, in the form of virtual buttons for user-selection of, for example, applications, options, or keys of a keyboard for user entry of data during operation of the portable electronic device 100.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a centre of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

Different types of touch events detected by the touch-sensitive display 118, such as touch gestures, are differentiated from each other by the duration of respective touch events. A touch and hold gesture is detected or recognized when a touch event occurs for a duration which is greater than or equal to a threshold duration. The threshold duration may be, for example, 400 milliseconds in some embodiments. Other threshold durations are possible. A tap gesture is detected or recognized when a touch event occurs for a duration which is less than the threshold duration. A tap gesture requires both a finger down and lift off within the threshold duration to be detected by the touch-sensitive display 118. A touch and hold gesture requires only a finger down for the threshold duration before the touch-sensitive display 118 detects the touch and hold gesture.

A one-finger touch and hold gesture occurs when a user touches a selectable onscreen item on the touch-sensitive display 118, such as a button or menu item, with one finger and holds the finger in contact with the touch-sensitive display 118 for a duration which exceeds the threshold duration. A two-finger touch and hold gesture occurs when a user touches a selectable onscreen item on the touch-sensitive display 118 with two-fingers and holds both fingers in contact with the touch-sensitive display 118 for a duration which exceeds the threshold duration. Touching a selectable onscreen item comprises touching a location of the touch-sensitive display 118 which is coincident with the selectable onscreen item displayed on the display screen 112. A location is coincident with the selectable onscreen item in that the centroid of the touch event is within an input area of the user interface screen assigned for receiving input for activating the selectable onscreen item. The input area of the selectable onscreen item may be different than the displayed area of the selectable onscreen item on the display screen 112 in some embodiments, typically the input area being larger than the displayed area in such embodiments to accommodate touch offset of the user.

The result of a tap, one-finger touch and hold gesture, or two-finger touch and hold gesture is context dependent.

A swipe gestures has a single direction which is evaluated with respect to an initial contact point (e.g., centroid) of the touch event at which the finger makes contact with the touch-sensitive display 118 and a terminal or ending contact point at which the finger is lifted from the touch-sensitive display 118 while in motion. This may reduce processing as the processor 102 does not utilize the information from all contact points of the entire gesture to resolve the direction of the touch gesture.

Examples of swipe gestures include a horizontal swipe gesture, a vertical swipe gesture, and a diagonal swipe gesture. A horizontal swipe gesture typically comprises an initial contact with the touch-sensitive display 118 towards its left or right edge to initialize the gesture, followed by a horizontal movement of the point of contact from the location of the initial contact to the opposite edge while maintaining continuous contact with the touch-sensitive display 118, and a breaking of the contact at the opposite edge of the touch-sensitive display 118 to complete the horizontal swipe gesture. Similarly, a vertical swipe gesture typically comprises an initial contact with the touch-sensitive display 118 towards its top or bottom edge to initialize the gesture, followed by a vertical movement of the point of contact from the location of the initial contact to the opposite edge while maintaining continuous contact with the touch-sensitive display 118, and a breaking of the contact at the opposite edge of the touch-sensitive display 118 to complete the vertical swipe gesture.

A diagonal swipe gesture typically comprises an initial contact with the touch-sensitive display 118 towards a corner to initialize the gesture, followed by a diagonal movement of the point of contact from the location of the initial contact to the opposite corner while maintaining continuous contact with the touch-sensitive display 118. Using the initial contact point and the end contact point, the processor 102 determines the direction of the gesture. For example, a horizontal swipe gesture could correspond to either a left or right direction.

Swipe gestures can be of various lengths, can be initiated in various places on the touch-sensitive display 118, and need not span the full dimension of the touch-sensitive display 118. In addition, breaking contact of a swipe can be gradual in that contact pressure on the touch-sensitive display 118 is gradually reduced while the swipe gesture is still underway.

The touch-sensitive display 118 is described herein in the context of fingers of a device user for purposes of convenience only. It will be appreciated that a stylus or other object may be used for interacting with the touch-sensitive display 118 depending on the type.

The motion detection subsystem 136 comprises at least one sensor which is coupled to the processor 102 and which is controlled by one or a combination of a monitoring circuit and operating software. The sensor has a sensing element which detects acceleration from motion and/or gravity. The sensor generates and outputs an electrical signal representative of the detected acceleration. Changes in movement of the portable electronic device 100 result in changes in acceleration which produce corresponding changes in the electrical signal output of the sensor. The sensor may be an accelerometer, such as a three-axis accelerometer having three mutual orthogonally sensing axes. The accelerometer may be digital or analog depending on the embodiment. The accelerometer may be utilized to detect acceleration of the portable electronic device 100, such as a direction of gravitational forces or gravity-induced reaction forces. Other types of motion sensors may be used by the motion detection subsystem 136 in addition to, or instead of, an accelerometer. The other motion sensors may comprise a proximity sensor, gyroscope, or both, which detect changes in the proximity and orientation of portable electronic device 100.

Changes in acceleration, proximity and orientation detected by the accelerometer, proximity sensor and/or gyroscope may be interpreted by the portable electronic device 100 as motion of the portable electronic device 100. When the changes in acceleration, proximity and orientation are within threshold tolerance(s) of regularity or predictability, the changes in acceleration, proximity and orientation match predetermined motion criteria (e.g., stored in the memory 110) and the changes may be interpreted by the portable electronic device 100 as a pattern of motion. Multiple patterns of motion may be recognized by the portable electronic device 100.

Figure 4C:
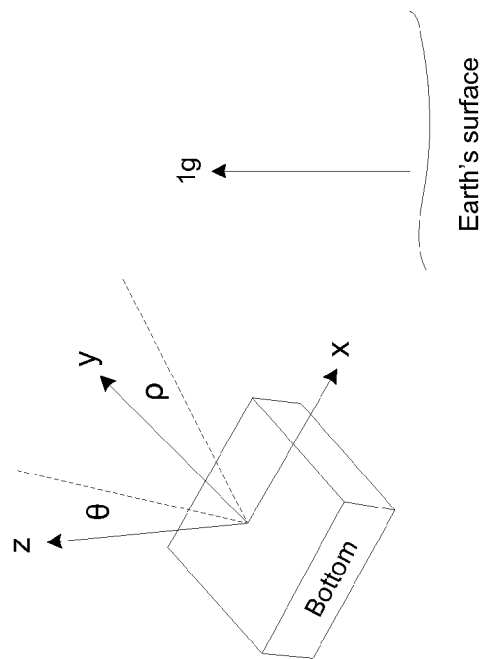
FIGS. 4A to 4C are schematic diagrams illustrating the assignment of pitch and roll vectors of a three-axis accelerometer in accordance with one example embodiment of the present disclosure.
Figure 4B:
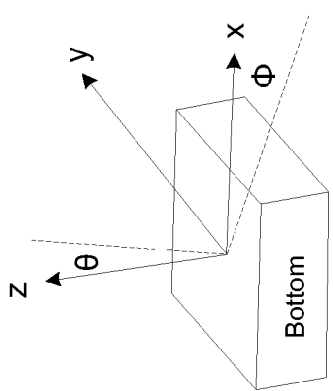
Figure 4A:
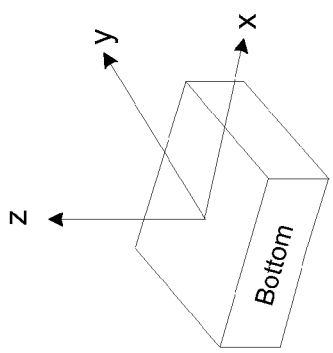

Referring now to FIGS. 4A to 4C, the assignment of pitch and roll vectors of a three-axis accelerometer in accordance with an example embodiment of the present disclosure will be described. The accelerometer has three mutually orthogonal sensing axes denoted "x", "y" and "z". The x-axis and y-axis are aligned with a horizontal plane defined with respect to the portable electronic device 100. The z-axis is perpendicular to the horizontal plane of the portable electronic device 100. The z-axis will detect when portable electronic device 100 is moved vertically.

Figure 5A:
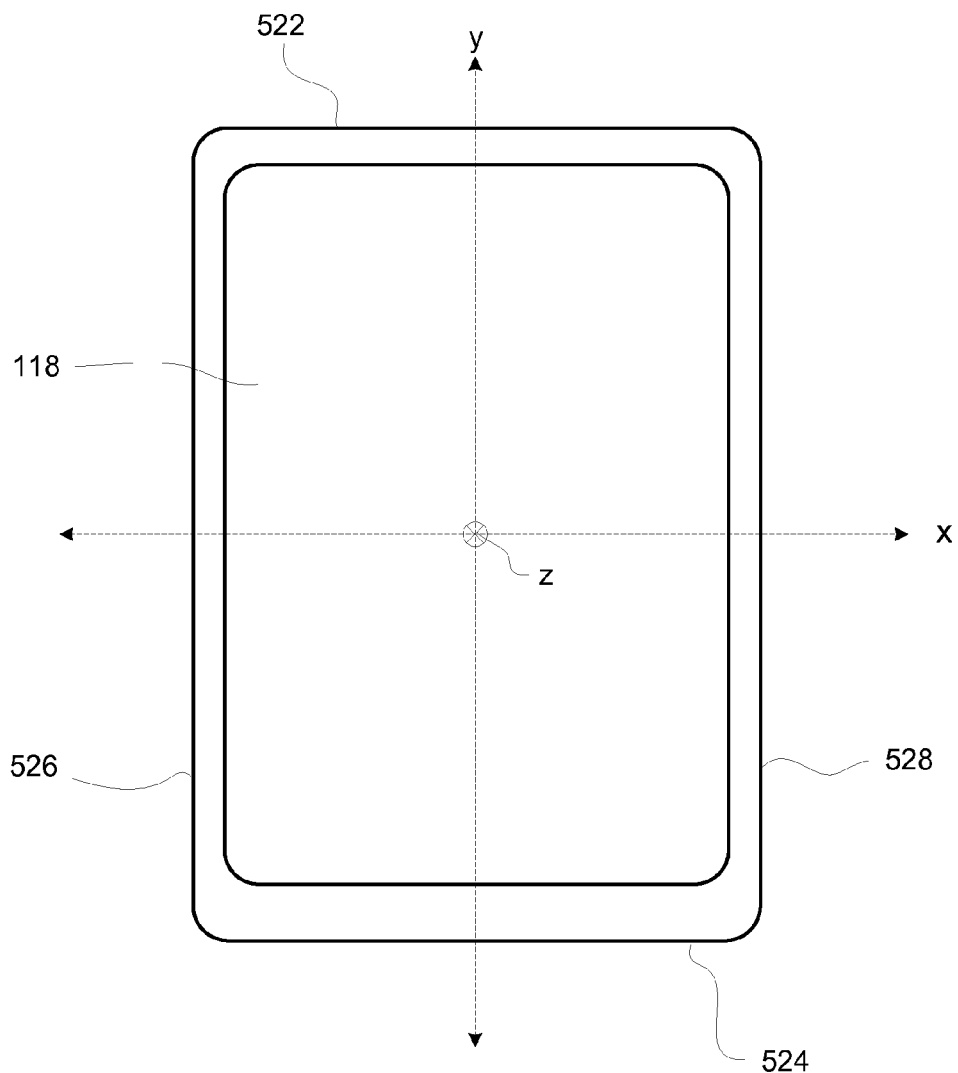
FIG. 5A is a front view of a portable electronic device showing sensing axes of three-axis accelerometer in accordance with one embodiment of the present disclosure.
Figure 5B:
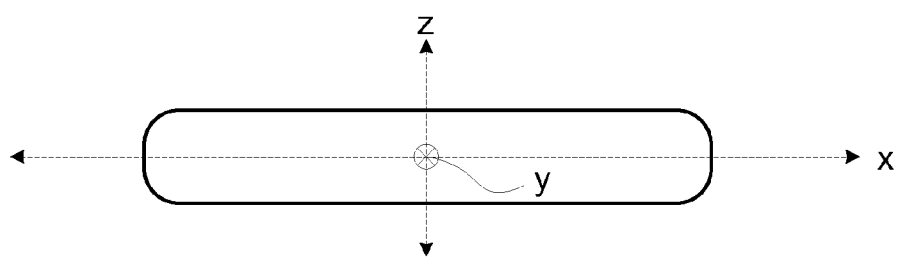
FIG. 5B is a top view of the portable electronic device of FIG. 5A.

Referring to FIGS. 5A and 5B, the alignment of the "x", "y" and "z" axes of the accelerometer with axes of the portable electronic device 100 in accordance with one embodiment of the present disclosure is shown. The x-axis is aligned about an axis extending laterally along the midpoint of the portable electronic device 100 between the top and bottom ends respectively. The y-axis is aligned about an axis extending longitudinally along the midpoint of the portable electronic device 100 between the left and right sides respectively. The z-axis extends perpendicularly through the x-y plane defined by the x and y axes at the intersection (origin) of these axes. It is contemplated that the "x", "y" and "z" axes may be aligned with different features of the portable electronic device 100 in other embodiments.

As shown in FIG. 4A, if the portable electronic device 100 is positioned horizontal (level with the ground), the z-axis measures 1 g in the z-axis. When the portable electronic device 100 is tilted away from the horizontal, the z-axis baseline reading is moved downwards away from 1 g level. As shown in FIG. 4B, pitch ($\phi$) is the angle of the x-axis relative to the ground. $\theta$ is the angle of the z-axis relative to gravity. As shown in FIG. 4C, roll ($\rho$) is the angle of the y-axis relative to the ground. It will be appreciated that rotation may occur about any combination of sensing axes. The concepts and methodology described herein can be applied to any orientation and any combination of pitch ($\phi$), roll ($\rho$) angles, and $\theta$ (the angle of the z-axis relative to gravity). The pitch ($\phi$), roll ($\rho$) and the angle of the z-axis relative to gravity ($\theta$) may be determined, for example, using standard equations.

Figure 3:
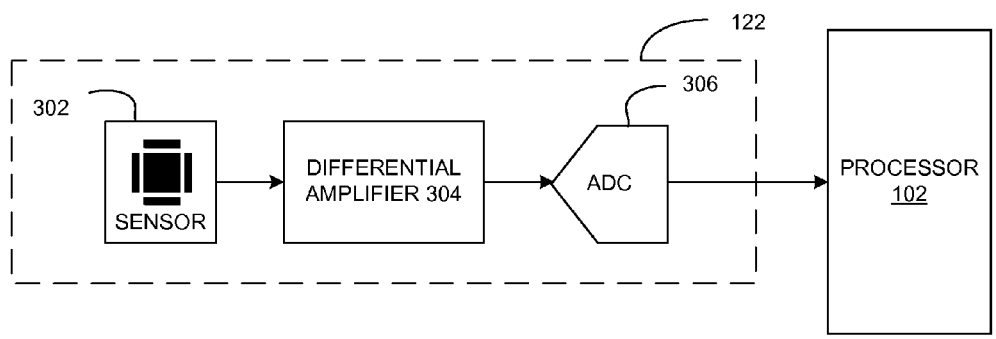
FIG. 3 is a block diagram of a magnetic sensor subsystem in accordance with one example embodiment of the present disclosure.

Referring now to FIG. 3, one example embodiment of the magnetic sensor subsystem 122 in accordance with the present disclosure will be described. The magnetic sensor subsystem 122 comprises at least one magnetic sensor 302. In at least some examples, the magnetic sensor 302 is a magnetometer which senses and measures the strength and/or direction of the magnetic field within the vicinity of the portable electronic device 100. The magnetic field measured by the magnetic sensor 302 may be the Earth's magnetic field, a magnetic field generated by one or more magnets in a peripheral device 600 (also known as an accessory device and described in more detail below), or a combination thereof.

The magnetic sensor 302, when operable, obtains or otherwise acquires readings including the direction of the magnetic field within the vicinity of the portable electronic device 100 and its strength. It will be appreciated that the magnetic sensor 302 is capable of detecting and measuring the direction and strength of the magnetic field within the vicinity of the portable electronic device 100, the vicinity within which the magnetic sensor 302 can measure the magnetic field depends on the particular type of magnetic sensor 302 which is used in a given embodiment. The readings are stored in a magnetic sensor readings data store (not shown) in memory 110. Various applications 148, such as a compass application (not shown), may utilize the readings in the data store. The applications 148 may use readings in the data store to determine a relative location (or directional heading) of a peripheral device 600 in accordance with a detected magnetic field generated by one or more magnets in the peripheral device 600. The applications 148 may also provide a user interface (UI) on the display 112, e.g. a real-time compass showing heading of the portable electronic device 100. The magnetic sensor 302 may be digital or analog depending on the embodiment.

The magnetic sensor 302, in at least some examples, may be a three-axis magnetometer having three mutually orthogonal sensing axes denoted "x", "y" and "z". The direction and strength of a magnetic field detected by the magnetic sensor 302 can be represented by the three axis values Hx, Hy and Hz. A relative location can be determined by using the Hx and Hy and optionally Hz components of the magnetic field. In some examples, a relative location can be determined by using only the Hx and Hy components of the magnetic field, that is, the directions planar with the Earth's surface. The Hx and Hy components of the magnetic field may be used, for example, when the portable electronic device 100 is positioned horizontally (e.g., when held flat by the user or placed on a flat surface). In some examples, the relative location of a peripheral device 600 can be determined from the x and y readings of the magnetic sensor 302, for example, using standard equations. The relative location may be determined in degrees or other suitable form.

The peripheral device 600, described in more detail below, includes a magnet which generates a magnetic field having one or more distinct characteristics that may be uniquely associated with the peripheral device 600. This allows the magnetic field generated by the peripheral device 600 to be differentiated from the Earth's magnetic field and other sources such as a magnetic field generated by other peripheral devices 600. When the one or more distinct characteristics of the magnetic field generated by a particular peripheral device 600 are known, e.g. stored in memory 110, the processor 102 can identify the particular peripheral device 600 associated with the detected magnetic field. In some embodiments, the portable electronic device 100 may be connected to one or a number of peripheral devices 600 which each generate a time varying magnetic field. The time varying magnetic field provides a distinct magnetic signature which is uniquely associated with a particular peripheral device 600. The time varying magnetic field may be generated, for example, by a variable electromagnet.

The magnetic sensor 302 may include a Hall Effect sensor for each sensing axis. A Hall Effect sensor is made of a semiconductor material, such as silicon, and has a flat rectangular shape. A Hall Effect sensor may be actuated by applying a current to its longitudinal ends so that the current flows longitudinally through the sensor. The longitudinal ends of the Hall Effect sensor are coupled to a regulated voltage source (not shown) and ground (not shown), respectively. When the current flows longitudinally through the Hall Effect sensor, a voltage differential is created across the sensor at its output(s) when a magnetic flux of proper polarity passes perpendicularly through the plane of the Hall Effect sensor. The magnitude of the voltage created is proportional to the magnetic flux density of the vertical component of the magnetic field.

Referring again to FIG. 3, the output of the magnetic sensor 302 is coupled to a differential amplifier 304. The differential amplifier 304 is coupled in parallel to the voltage source and ground. The differential amplifier 304 amplifies the voltage output of the Hall Effect sensor to produce an amplified output which is proportional to the magnetic flux density passing through the Hall Effect sensor. The output of the differential amplifier 304 is a signal proportional to magnetic flux density being received by the Hall Effect sensor.

The output of the differential amplifier 304 is sent to an analog-to-digital converter (ADC) 306 which converts the analog values to digital values. The output of the ADC 306 is coupled to the processor 102 which receives the digital value as input for analysis. Alternatively, in other embodiments the output of the differential amplifier 304 may be sent to and analysed by a dedicated controller (not shown) which is coupled to the processor 102 via interrupt ports and optionally serial data ports. The relationship between the magnetic flux density of a magnetic field and the relative location or directional heading of a peripheral device 600 having a magnet which generates a magnetic field is stored in the memory 110 or an internal memory of the dedicated controller, for example, in firmware. The relationship may be defined, for example, by an equation or series of equations, or empirical data.

When the device 600 is generating a magnetic field, changes in the location of the peripheral device 600 relative to the portable electronic device 100 cause changes in the magnetic field sensed by the magnetic sensor 302. The changes in the magnetic field result in changes in the output voltages of the magnetic sensor 302, which represent the magnetic flux density sensed by the magnetic sensor 302. The processor 102 compares magnetic flux density to one or more predetermined criteria to determine a location of the magnet relative to the portable electronic device 100. The relative location of the peripheral device 600 magnet may be determined, for example, as a coordinate value in two dimensional (e.g., x and y) or three dimensional (e.g., x, y and z) coordinate space using the relationship between the magnetic flux density and relative location.

Figure 6:
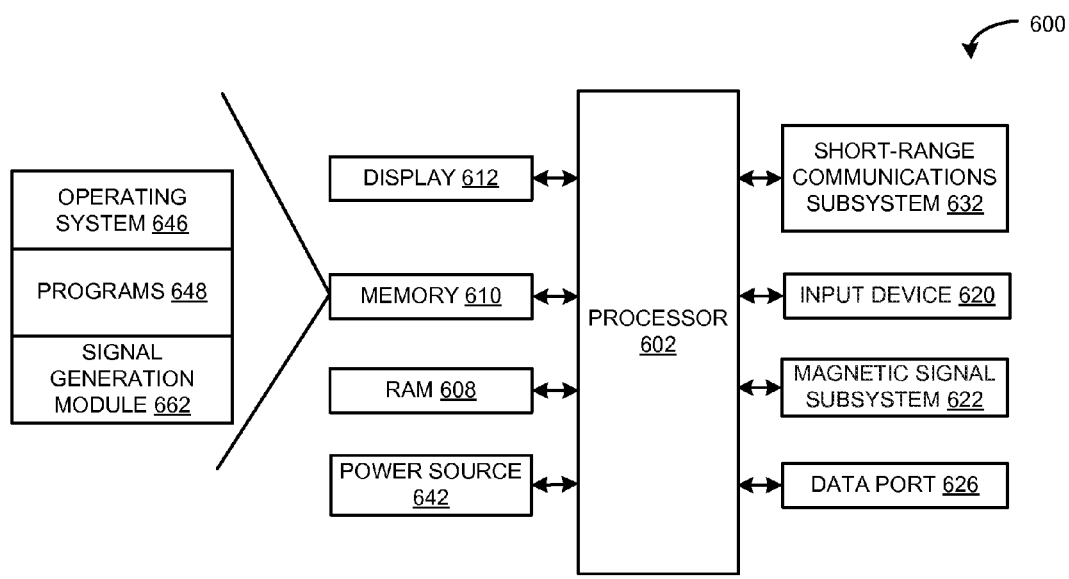
FIG. 6 is a simplified block diagram of components of a peripheral device in accordance with one example embodiment of the present disclosure.

Reference is now made to FIG. 6 which illustrates in block diagram form a peripheral device 600 in accordance with one example embodiment. The peripheral device 600 is an electronic device which connects to a host portable electronic device 100. The peripheral device 600 expands the capabilities of the host portable electronic device 100 but does not form part of the portable electronic device 100, and is largely dependent on the host portable electronic device 100 for its control and operation. The peripheral device 600 and portable electronic device 100, in at least some examples, may have a master-slave relationship in which the operation of the peripheral device 600 is controlled by the host portable electronic device 100. Peripheral devices 600 are sometimes referred to as accessories or external devices.

Examples of the peripheral device 600 include, but are not limited to, an input device (such as a keyboard, mouse, touchpad, camera or microphone), output device (such as a display, speaker(s), ear-bud or headphones), hands-free calling device, navigation device (such as a Global Positioning System (GPS) navigation device), home theatre or stereo system, electronic gaming device, digital photograph album (such as a digital picture frame) or digital camera. The peripheral device 600 may be another portable electronic device 100, for example, the peripheral device 600 may be a tablet computing device (commonly known as a tablet) used as a display for output.

The peripheral device 600 includes multiple components, such as a processor 602 that controls the overall operation of the peripheral device 600. The processor 602 interacts with other components, such as RAM 608, memory 610 such as flash memory, display 612 such as an LCD, input device 620 such as a push button, magnetic signal subsystem 622, data port 626, short-range wireless communication subsystem 632, and power source 642, such as one or more rechargeable batteries or a port to an external power supply, powers the peripheral device 600. The processor 602 operates under stored program control with software stored in the memory 610 or firmware. In at least some examples, the stored programs include an operating system 646 and software applications 648 that are executed by the processor 602. The applications 648 include a signal generation module 662 for generating a magnetic field, for example, in response to an instruction received from the portable electronic device 100 over the short-range wireless communication subsystem 632. The signal generation module 662 may be a standalone application or part of the operating system 646.

The peripheral device 600 can connect to the portable electronic device 100 using the short-range wireless communication subsystem 632 and possibly the data port 626. The short-range wireless communication subsystem 632 provides a short-range wireless communication interface and is of the same type as the short-range wireless communication subsystem 132 of the portable electronic device 100. Thus, the short-range wireless communication interface 632 is typically a BLUETOOTH® interface but may be another type of short-range wireless communication interface including, but not limited to, an IR interface such as an IrDA interface, an IEEE 802.15.3a interface (or UWB), Z-Wave interface, Zig-Bee interface or other suitable short-range wireless communication interface.

The magnetic signal subsystem 622 includes an electric-to-magnetic transducer (not shown), typically in the form of a wire coil, which converts electrical signals received from the processor 602 into magnetic signals which form a magnetic field having one or more distinct characteristics that may be uniquely associated with a particular peripheral device 600. The magnetic signals may be magnetic representations of a designated electrical signal such as designated waveform. In at least some examples, the magnetic signals form a varying magnetic field which varies with respect to time similar to a hearing aid compatibility (HAC) coil. The time varying magnetic field generated by the magnetic signal subsystem 622 provide a variable electromagnet and may be used to provide a distinct magnetic signature which is uniquely associated with a particular peripheral device 600.

The magnetic field generated by the magnetic signal subsystem 622 may be detected by the magnetic sensor subsystem 123 of the portable electronic device 100 when located in sufficient proximity to the peripheral device 600. When the one or more distinct characteristics of the magnetic field generated by a particular peripheral device 600 are known, e.g. stored in memory 110, the processor 102 of the portable electronic device 100 can identify the particular peripheral device 600 associated with the detected magnetic field.

Parameters describing one or more distinct characteristics of the magnetic field generated by the known peripheral devices 600 may be stored in the memory 110 of the portable electronic device 100 during a pairing process to enable short-range wireless communication between the portable electronic device 100 and peripheral devices 600. As noted above, the short-range wireless communication interface is used for communication between the portable electronic device 100 and peripheral devices 600 is a BLUETOOTH® interface in at least some examples; however, other short-range wireless communication technologies may be used in other embodiments.

Some aspects of pairing of a portable electronic device 100 with a peripheral device 600 for communication using BLUETOOTH® interfaces are well known. The portable electronic device 100 receives identifying information (such as a name and Media Access Control (MAC) address) from the peripheral device 600 during the pairing process. Further to the BLUETOOTH® pairing process, the parameters describing one or more distinct characteristics of the magnetic field may be provided by the peripheral device 600, or may be determined by the portable electronic device 100 during pairing in response to generation of the magnetic field by the peripheral device 600. Other data may be exchanged between the portable electronic device 100 and peripheral device 600 during pairing. Pairing information, the identifying information and the parameters describing one or more distinct characteristics of the magnetic field generated by the peripheral device 600, is stored in a profile, for example in the BLUETOOTH® profile, in the memory 110 of the portable electronic device 100 for the respective peripheral device 600.

Figure 7:
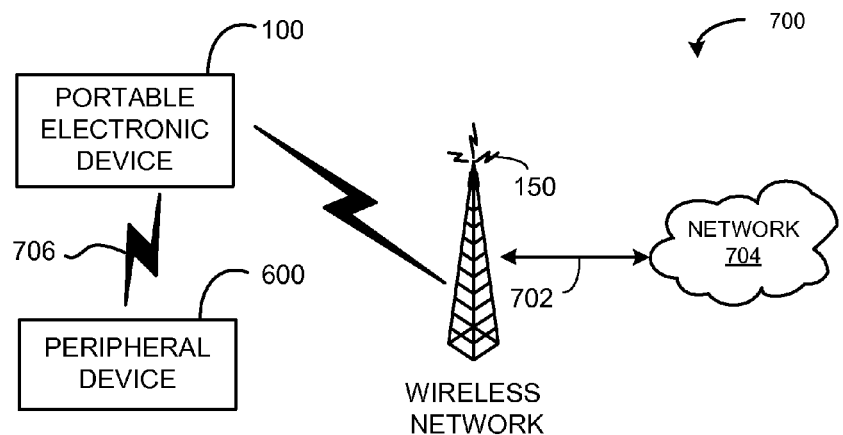
FIG. 7 is a simplified block diagram of a communication system suitable for carrying out example embodiments of the present disclosure.

Reference is now made to FIG. 7 which shows an example of a communication system 700 suitable for carrying out example embodiments of the present disclosure. The communication system 700 includes one or more portable electronic device 100 (only one of which is shown in FIG. 7) that are enabled to communicate with the wireless network 150. The wireless network 150 may be, but is not limited to a, Wireless Wide Area Network (WWAN) or Wireless Local Area Network (WLAN) that conforms to IEEE 802.11 standards such as 802.11a/b/g/n. The wireless network 150 may be connected through intermediate communications links 702, comprising for example the Internet, to one or more private communication networks 704 such as an enterprise network.

A portable electronic device 100 may wirelessly connect to a peripheral device 600 using a short-range wireless communication path 706. The short-range wireless communication path 706 may be a wireless personal area network (WPAN) or WLAN connection. The short-range wireless communication path 706 is typically a BLUETOOTH® connection but may be another type of short-range wireless communication connection, including but not limited to, an IR connection such as an IrDA connection, UWB connection, Z-Wave connection, ZigBee connection or other suitable short-range wireless communication connection.

Figure 8:
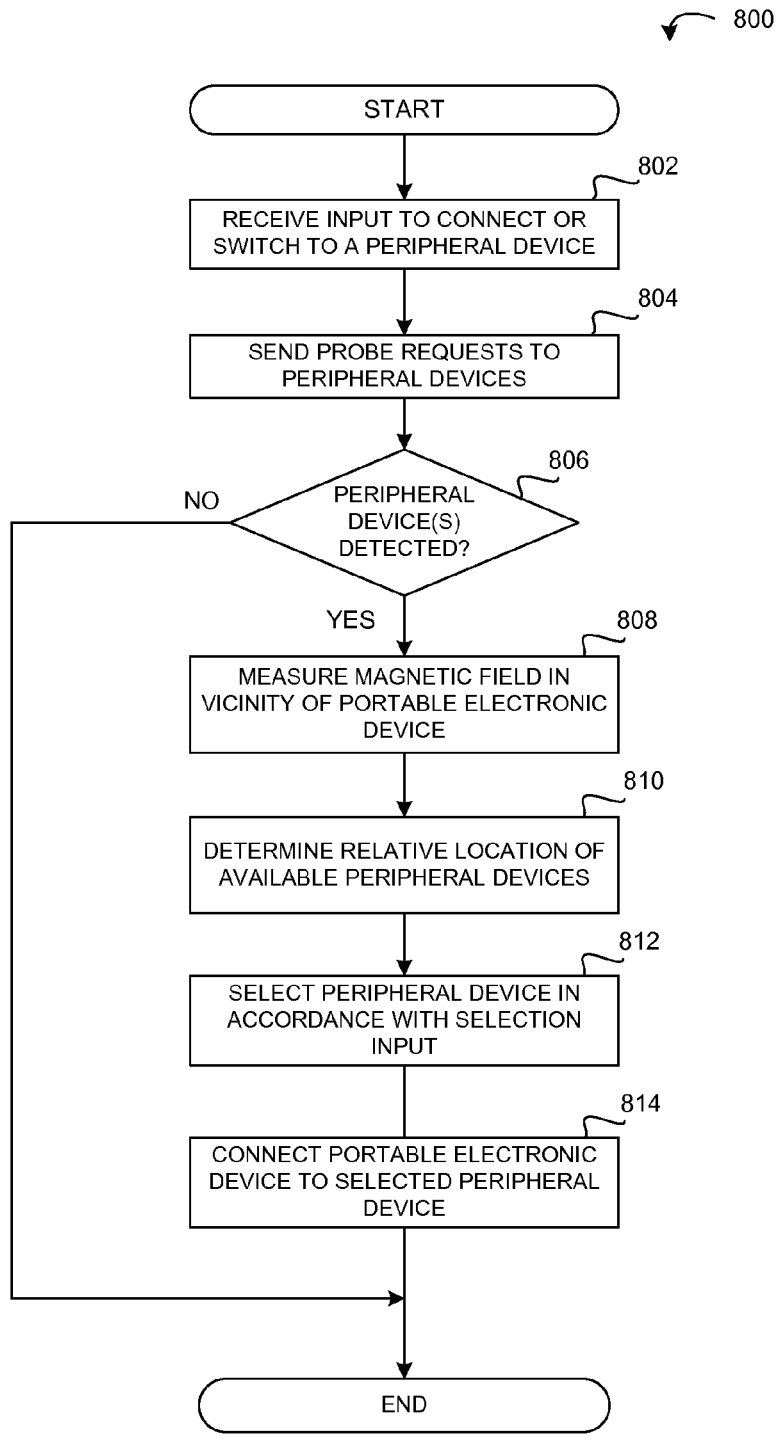
FIG. 8 is a flowchart of a method for device selection using sensory input on a portable electronic device in accordance with one embodiment of the present disclosure.

A flowchart illustrating one example embodiment of a method 800 for connecting electronic devices is shown in FIG. 8. The method is performed partly on the portable electronic device 100 and partly on a peripheral device 600. The method 800 may be carried out at least in part by software in the form of the device selection module 162 and signal generation module 662 which are executed, by the processors 102, 602 of the portable electronic device 100 and peripheral device 600 respectively. Coding of software for carrying out the method 800 is within the scope of a person of ordinary skill in the art provided the present disclosure. The method 800 may contain additional or fewer processes than shown and/or described, and may be performed in a different order. Computer-readable code executable by the processors 102, 602 to perform the method 800 may be stored in a computer-readable medium of the portable electronic device 100 and peripheral device 600 respectively such as the memory 110, 610.

The processor 102 monitors for and detects input to connect to a peripheral device 600 when the portable electronic device 100 is not connected to a peripheral device 600, or input to change (or switch) a peripheral device 600 with which the portable electronic device 100 is connected over the short-range wireless communication path 706 when the portable electronic device 100 is already connected to one or more peripheral devices 600 (802). It will be appreciated that the portable electronic device 100 may connect to multiple peripheral devices 600 over the short-range wireless communication path 706 (e.g., a BLUETOOTH® communication path).

In one example use case, a portable electronic device 100 such as a handheld electronic device is BLUETOOTH® paired with multiple peripheral devices 600. At least one of the peripheral devices 600, such as a tablet, includes a relatively large display viewing content. A user may desire to view an attachment to an electronic message (e.g., email), downloaded content, or streamed content on one of the paired peripheral devices 600 but may want to select a particular one of the peripheral devices 600.

When input to connect to a peripheral device 600, or input to change a peripheral device 600 is received, the portable electronic device 100 actively scans for BLUETOOTH® enabled peripheral devices 600 by sending probe requests to all BLUETOOTH® enabled peripheral devices 600 having a BLUETOOTH® profile stored in memory 110 (i.e., all BLUETOOTH® enabled peripheral devices 600 with which the portable electronic device 100 is paired) at 804. The probe requests are a type of status request which requests that all BLUETOOTH® enabled peripheral devices provide identifying information and possibly a signal quality indication in a probe response. The format and content of BLUETOOTH® probe requests and responses are well known in the art as are probe requests and responses for other types of short-range wireless communication connections. It will be appreciated that the portable electronic device 100 may be paired with a number of BLUETOOTH® enabled peripheral devices 600 such as a tablet, ear-bud and hands-free calling device. Each BLUETOOTH® enabled peripheral device 600 with which the portable electronic device 100 is paired has its own BLUETOOTH® profile stored in memory 110.

When the BLUETOOTH® enabled peripheral devices 600 receive the probe request from the portable electronic device 100, the processor 602 of the peripheral devices 600 causes a probe response to be sent (e.g., a BLUETOOTH® probe response) using the short-range wireless communication subsystem 632 and causes the magnetic signal subsystem 622 to generate a magnetic field having one or more distinct characteristics that may be uniquely associated with the respectively particular peripheral devices 600. As noted above, the magnetic field may be a time varying magnetic field which provides a distinct magnetic signature which is uniquely associated with a particular peripheral device 600. The time varying magnetic field generated by the peripheral devices 600 may vary in period, offset and/or amplitude. The time varying magnetic field generated by the peripheral devices 600 may be of a distinct waveform type, such as a sinusoidal wave, square wave, triangular wave, saw tooth wave or pulse wave, which varies in period, offset and/or amplitude.

Alternatively, the identifying information and possibly a signal quality indication of the available peripheral devices 600 are determined from incoming connection requests received by the portable electronic device 100 from the available peripheral devices 600.

The portable electronic device 100 receives responses from the available peripheral devices 600. The processor 102 determines whether any peripheral devices 600 are available in accordance with whether any responses to the probe requests are received. The processor 102 may also determine the available peripheral devices 600 from the responses to the probe requests which are received (806).

The portable electronic device 100 then measures the magnetic field within the vicinity of the portable electronic device 100 using the magnetic sensor subsystem 123, for example, using the magnetic sensor 302 (808). The magnetic field measured by the magnetic sensor 302 may be the Earth's magnetic field, a time varying magnetic field generated by available peripheral devices 600, or a combination thereof.

The processor 102 determines a relative location (or directional heading) of available peripheral devices 600 in accordance with the measured magnetic field (810). In one example, the portable electronic device 100 may use digital signal processing algorithms to differentiate between the Earth's magnetic field and the magnetic field generated by available peripheral devices 600. This may involve differentiating and analyzing static and time varying magnetic fields. The measured magnetic field(s) are compared to stored parameters describing the magnetic fields generated by known peripheral devices 600. When the measured magnetic field matches parameters for a known peripheral device 600, a peripheral device 600 is identified. The stored parameters describe one or more distinct characteristics of the magnetic field generated by the known peripheral devices 600. When the peripheral devices 600 each generate a time varying magnetic field, the stored parameters may comprise a period, offset and/or amplitude of the time varying magnetic field. As noted above, the time varying magnetic field provides a distinct magnetic signature which is uniquely associated a particular peripheral device 600.

As noted above, in some examples, a relative location can be determined by using only the Hx and Hy component of the magnetic field, that is, the directions planar with the Earth's surface, for example, when the portable electronic device 100 is positioned horizontally (e.g., when held flat by the user or placed on a flat surface). A prompt for the user to place the portable electronic device 100 in a substantially horizontal position, such as on a flat surface, may be displayed on the display 112 prior to measuring the magnetic field in the within the vicinity of the portable electronic device 100 in 802. The prompt may be displayed, for example, in response to receiving input to connect to a peripheral device 600 or input to change a peripheral device 600.

The processor 102 monitors for and detects selection input selecting one of the available peripheral devices 600 received by an input device, such as the touch-sensitive display 118, motion detection subsystem 136 or navigation device 122. The processor 102 selects an available peripheral device 606 in accordance with the selection input (812).

The selection input may comprise a directional input. Alternatively, the selection input may be touching (or touching and holding) an onscreen button displayed on the touch-sensitive display 118 corresponding to a particular one of the available peripheral devices 600, depressing a designated button 120 corresponding to a particular one of the available peripheral devices 600, or depressing a designated key in a keyboard or keypad corresponding to a particular one of the available peripheral devices 600, or other suitable selection input.

The directional input may be a touch gesture sensed by the touch-sensitive display 118, a motion gesture sensed by motion detection subsystem 136, a navigational input received by the navigation device 122 or other suitable directional input. For example, the directional input may be a swipe gesture having an identifiable direction, or possibly another type of directional touch gesture having an identifiable direction. The motion gesture may be limited to a specific type of motion gesture having an identifiable direction, such as a pointing gesture, or may be any type of motion gesture having an identifiable direction. The navigational input may be a directional movement sensed by navigation device 122 such as a depressible optical joystick. The directional movement sensed by the navigation device 122 may be a vertical or horizontal movement, such as an up, down, left or right movement, or possibly a diagonal movement such as an up-right, up-left, down-right or down-left movement.

The processor 102 selects the available peripheral device 606 by comparing the directional input with the relative locations of the available peripheral devices 600, determining which of the available peripheral devices 606 has a relative location (or heading) nearest to a direction of the directional input, and selecting the available peripheral device 606 having a relative location (or heading) nearest to the direction of the directional input.

To facilitate user interaction, a prompt may be displayed on the touch-sensitive display 118 to notify the user to provide the directional input or other selection input. For example, when the selection input is directional input in the form of a motion gesture, the prompt "Point Handheld at BLUETOOTH® Device" may be displayed on the touch-sensitive display 118. When the selection input is directional input in the form of a touch gesture, the prompt "Perform Swipe in Direction of BLUETOOTH® Device" may be displayed on the touch-sensitive display 118. When the selection input is directional input in the form of navigation input from a mechanical navigation device 122, the prompt "Move Navigation Device in Direction of (New) BLUETOOTH® Device" may be displayed on the touch-sensitive display 118. When the navigation device 122 is a depressible optical joystick, the prompt "Perform Swipe in Direction of BLUETOOTH® Device" may be displayed on the touch-sensitive display 118.

After an available peripheral device 606 is selected in accordance with selection input, the processor 102 connects to the selected peripheral device 606 using the short-range wireless communication path 706 (e.g., a BLUETOOTH® communication path) at 814. Though not shown, in some examples, when only one peripheral device 600 is available, the processor 102 may automatically select the peripheral device 600 without selection input. In alternative embodiments, selection input may not be required. Instead, automatic selection of a peripheral device 600 from multiple peripheral device 600 which are available may be performed using a priority list or other scheme which ranks peripheral devices 600 with which the portable electronic device 100 has been paired in a connection order which describes the order in which the portable electronic device 100 selects peripheral devices 600 for connection.

The present disclosure provides a method of device selection using sensory input which is more intuitive and possibly faster than conventional methods which require users to navigate cumbersome hierarchical menus in order to locate and select the appropriate menu options to connect to a peripheral device 600, or change a peripheral device 600 to which the portable electronic device 100 is connected. The method provided is relatively simple and intuitive, thereby facilitating user adoption.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from its spirit or essential characteristics. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. A method for use in a portable electronic device for selecting a peripheral device for connection with the portable electronic device, comprising:
   measuring magnetic fields within the vicinity of the portable electronic device;
   identifying at least two peripheral devices in accordance with measured magnetic fields and one or more distinct characteristics of a magnetic field generated by each of the at least two peripheral devices which uniquely identify each of the at least two peripheral devices;
   determining a relative location of the at least two peripheral devices in accordance with a magnetic flux density of the measured magnetic fields and a relationship between magnetic flux density and relative location;
   receiving a selection input;
   identifying the peripheral device from the at least two peripheral devices in accordance with the selection input;
   selecting the identified peripheral device; and
   connecting the portable electronic device to the selected peripheral device using a wireless communications path.

2. The method of claim 1 wherein the selection input is a received gesture.

3. The method of claim 1 wherein the selection input is a directional input.

4. The method of claim 3 wherein the identifying comprises:
   comparing the directional input with the relative locations of the at least two available peripheral devices;
   determining which of the at least two available peripheral devices has a relative location nearest to a direction of the directional input; and
   selecting the peripheral device having a relative location nearest to the direction of the directional input.

5. The method of claim 3 wherein the directional input is a touch gesture detected by a touch-sensitive display.

6. The method of claim 3 wherein the directional input is a motion gesture.

7. The method of claim 1 further comprising:
   sending requests to one or more peripheral devices in response to receiving input to connect to a peripheral device or switch the peripheral device which the portable electronic device is connected to;
   receiving responses from the at least two peripheral devices, wherein the responses include identifying information concerning the at least two peripheral devices.

8. The method of claim 7 further comprising:
   generating on the at least two peripheral devices a magnetic field having one or more distinct characteristics which are uniquely associated with a particular peripheral device in response to receiving the request.

9. The method of claim 7 wherein the requests are only sent to peripheral devices for which a profile is stored in a memory of the portable electronic device.

10. The method of claim 1 wherein the at least two peripheral devices generate a time varying magnetic field which provides a distinct magnetic signature which provides the one or more distinct characteristics of a magnetic field generated by each of the at least two peripheral devices.

11. The method of claim 1 wherein the wireless communication path is a BLUETOOTH communication path.

12. An electronic device, comprising:
a processor;
a magnetic sensor coupled to the processor for detecting magnetic fields within the vicinity of the electronic device;
a wireless communication subsystem coupled to the processor;
wherein the processor is configured for:
  measuring magnetic fields within the vicinity of the portable electronic device;
  identifying at least two peripheral devices in accordance with measured magnetic fields and one or more distinct characteristics of a magnetic field generated by each of the at least two peripheral devices which uniquely identify each of the at least two peripheral devices;
  determining a relative location of the at least two peripheral devices in accordance with a magnetic flux density of the measured magnetic fields and a relationship between magnetic flux density and relative location;
  detecting a touch gesture on a touch-sensitive display;
  comparing a direction of the touch gesture with the relative locations of the at least two available peripheral devices;
  determining which of the at least two available peripheral devices has a relative location nearest to the direction of the touch gesture;
  selecting the peripheral device having a relative location nearest to the direction of the touch gesture; and
  connecting to the selected peripheral device using a wireless communication path.

13. The method of claim 10, wherein the time varying magnetic field has a characteristic period, offset and/or amplitude.

14. The method of claim 10, wherein the time varying magnetic field has a characteristic waveform type.

15. The method of claim 14, wherein the time varying magnetic field is a sinusoidal wave, square wave, triangular wave, saw tooth wave or pulse wave.

16. The method of claim 15, wherein the time varying magnetic field has a characteristic period, offset and/or amplitude.

17. A method for use in a portable electronic device for selecting a peripheral device for connection with the portable electronic device, comprising:
  measuring magnetic fields within the vicinity of the portable electronic device;
  identifying at least two peripheral devices in accordance with measured magnetic fields and one or more distinct characteristics of a magnetic field generated by each of the at least two peripheral devices which uniquely identify each of the at least two peripheral devices;
  determining a relative location of the at least two peripheral devices in accordance with a magnetic flux density of the measured magnetic fields and a relationship between magnetic flux density and relative location;
  detecting a touch gesture on a touch-sensitive display;
  comparing a direction of the touch gesture with the relative locations of the at least two peripheral devices;
  determining which of the at least two peripheral devices has a relative location nearest to the direction of the touch gesture;
  selecting the peripheral device having a relative location nearest to the direction of the touch gesture; and
  connecting the portable electronic device to the selected peripheral device using a wireless communications path.

* * * * *